(12) United States Patent
Singh

(10) Patent No.: US 7,384,478 B2
(45) Date of Patent: Jun. 10, 2008

(54) APPARATUS AND PROCESS FOR PREPARING CRYSTALLINE PARTICLES

(75) Inventor: Hardev Singh, Dartford (GB)

(73) Assignee: Glaxo Group Limited, Greenford, Middlesex (GB)

( * ) Notice: Subject to any disclaimer, the term of this patent is extended or adjusted under 35 U.S.C. 154(b) by 174 days.

(21) Appl. No.: 10/501,940

(22) PCT Filed: Jan. 21, 2003

(86) PCT No.: PCT/EP03/00558

§ 371 (c)(1),
(2), (4) Date: Apr. 14, 2005

(87) PCT Pub. No.: WO03/061816

PCT Pub. Date: Jul. 31, 2003

(65) Prior Publication Data

US 2006/0096522 A1    May 11, 2006

(30) Foreign Application Priority Data

Jan. 22, 2002    (GB) .................................. 0201400.9

(51) Int. Cl.
*C30B 7/08*    (2006.01)

(52) U.S. Cl. ............................... 117/68; 117/69; 117/70; 117/933; 422/245.1

(58) Field of Classification Search ................... 117/68, 117/69, 70, 933; 422/245.1
See application file for complete search history.

(56) References Cited

U.S. PATENT DOCUMENTS

| 3,711,558 | A | * | 1/1973 | Huang et al. ................. 568/811 |
| 3,749,318 | A |   | 7/1973 | Cottell |
| 5,471,001 | A | * | 11/1995 | Anderson et al. ............ 562/593 |
| 5,604,206 | A | * | 2/1997 | Paradies ....................... 514/23 |
| 6,339,079 | B1 | * | 1/2002 | Kasch et al. ................. 514/182 |
| 2003/0203937 | A1 | * | 10/2003 | Al-Ghazawi et al. ........ 514/321 |

FOREIGN PATENT DOCUMENTS

| GB | 2236958 | 4/1991 |
| JP | 57056031 | 4/1982 |
| JP | 58163425 | 9/1983 |
| JP | 05168889 | 7/1993 |
| JP | 09010666 | 1/1997 |
| WO | WO 00/38811 | 7/2000 |
| WO | WO 00/44468 | 8/2000 |

* cited by examiner

*Primary Examiner*—Robert Kunemund
(74) *Attorney, Agent, or Firm*—Alice P. Bradkey

(57) ABSTRACT

A process for preparing crystalline particles, especially particles of a pharmaceutical or carrier substance suitable for inhalation therapy, in addition to apparatus for the preparation of such particles.

13 Claims, 4 Drawing Sheets

APPARATUS AND PROCESS FOR PREPARING CRYSTALLINE PARTICLES

CROSS-REFERENCES TO RELATED APPLICATIONS

This application is filed pursuant to 35 USC 371 as a U.S. National Phase Application of International Patent Application Serial No. PCT/EP03/00558 filed on 21 Jan. 2003 which claims priority from GB 0201400.9 filed on 22 Jan. 2002 in the United Kingdom.

FIELD OF THE INVENTION

This invention relates to a novel apparatus for preparing crystalline particles, particularly particles of defined particle size distribution, especially particles of therapeutically useful or carrier substances of a size suitable for inhalation therapy. There is also provided a process for preparing the same.

BACK GROUND OF THE INVENTION

Industrial processes for production of many products, particularly pharmaceutical products, require the preparation of pure substances of a defined particle size distribution. Pure substances are frequently prepared by crystallisation from solutions of lesser purity. When crystallisation takes place relatively slowly (e.g. over a matter of hours), crystals are grown which are frequently of a nonuniform shape and relatively large size.

In the field of inhalation therapy, therapeutic molecules are generally desired of a particle size "suitable for inhalation", which is a term generally taken to indicate an aerodynamic diameter between 1 and 10 µm, especially 1 and 5 µm, particularly 1 and 3 µm. Carrier molecules (such as lactose) for inhaled therapeutic preparations are typically desired of a significantly larder aerodynamic diameter so that they do not penetrate into the upper respiratory tract to the same degree as the active ingredient and an aerodynamic diameter of 100 to 150 µm is generally considered suitable. However this is a generalisation and for some purposes it may well be preferred to use a lower particle size for the carrier, even one comparable to that of the therapeutic substance.

Outside of the inhaled area, modification of the habit and size of crystals is a valuable tool in adjusting and optimising pharmaceutical and biological properties such as flow characteristics, dissolution rate and bioavailability.

Particles of the desired particle size for inhalation therapy are conventionally prepared by milling or micronisation. These processes, depending on the precise conditions adopted, are capable of generating particle distributions which include fractions having particles with the appropriate size. Milling is suitable for preparing particles of the larger size indicated above and micronisation of the smaller size indicated above. However, there are a number of disadvantages associated with milling and micronisation processes including that the fraction having the desired particle size may be relatively small, that there may be generated a significant fraction of particles that are finer than is desired (which may be deleterious e.g. if it affects bioavailability) and that product losses generally may be considerable (e.g. through coating of the machinery). A further property of micronised products is that the surfaces of the particles generated are generally substantially amorphous (i.e. have minimal crystallinity). This may be undesirable when there exists a tendency for the amorphous regions to convert to a crystalline state. Furthermore micronised or milled products may be more susceptible to moisture uptake than crystalline products. Micronisation and milling processes also suffer from the disadvantages that they are relatively energy intensive and require containment and other measures to avoid the risk of dust explosion.

Rapid precipitation (e.g. by dilution of a solution with an anti-solvent) may give rise to crystalline particles which could be of suitable size, however this technique is notoriously difficult to control and has not found widespread acceptance in the pharmaceutical industry, particularly in relation to inhalation products.

The use of ultrasonic radiation to increase effectiveness of crystallisation in purification of organic substances is described in Yurhevich, et al. (1972), Primen. Ul'trazvuka Met. Protsessakh, Mosk. Inst. Stali Splavov 67, 103-106.

A process and apparatus for preparing crystalline particles employing a continuous flow cell in the presence of ultrasonic radiation were described in patent application WO 00/38811 (Glaxo Group).

BRIEF SUMMARY OF THE INVENTION

We have now invented a novel process and apparatus for preparing crystalline particles.

Thus according to a first aspect of the invention there is provided, a process for preparing crystalline particles of substance which comprises mixing in a continuous flow cell in the presence of ultrasonic radiation a flowing solution of the substance in a liquid solvent with a flowing liquid anti-solvent for said substance, and collecting the resultant crystalline particles generated, characterised in that the solution and anti-solvent are delivered into the continuous flow cell in parallel contacting streams.

The advantages of the invention include the fact that the process is capable of running continuously (subject to adequate supply of solution and anti-solvent) even if, for a particular application, it may be desired to run it only for a relatively short time. Also since the process is an essentially "wet" process it significantly reduces hazards associated with dry particulate matter. A feature of the process is that in a steady state the concentration of dissolved substance in the mixing chamber of the flow cell remains approximately constant since the precipitating substance is replaced by the inflow of further solution. This allows the process to be run continuously and reproducibly. We have found that the process according to the invention is capable of being very efficient and economical with product yields of up to 95-98%.

The present process has advantages over that described in WO 00/38811 in that it is capable of generating particles of smaller size, in particular particles in the low micron range, especially particles of size less than 2 microns.

According to a second aspect of the invention there is provided an apparatus for preparing crystalline particles of a substance which comprises:
(i) a first reservoir of said substance dissolved in a liquid solvent;
(ii) a second reservoir of liquid antisolvent for said substance;
(iii) a mixing chamber having first and second inlet ports and an outlet port;
(iv) means for delivering the contents of the first and second reservoirs to the mixing chamber via the first and second inlet ports respectively at independent controlled flow rate, which first and second inlet ports are orientated such that the contents of the first and second reservoirs are delivered into the mixing chamber in parallel contacting streams;
(v) a source of ultrasonic radiation located in the vicinity of the first inlet; and (vi) means for collecting crystalline particles suspended in the liquid discharged from the mixing chamber at the outlet port.

According to both the first and second aspects of the invention, preferably the liquid anti-solvent is miscible with the liquid solvent.

Preferably the first and second inlets protrude into the flow cell such that the liquids outflow into the body of liquid in the mixing chamber.

Preferably the outflow from the first and second inlets is directed towards the source of ultrasound radiation.

In a first example embodiment, the first and second inlets are adjacent to each other such that the streams of liquid outflowing from each inlet contact along one side of the stream. Depending on the physical dimensions of the inlet orifice, the contact may, for example, be essentially a point contact when viewed in cross section (when the two inlets have circular orifices) or a line contact when viewed in cross section (when the two inlets have square section).

In a second example embodiment, the first and second inlets are disposed coaxially such that one inlet completely surrounds the other inlet. The outflowing streams in this disposition would have, for example, a concentric circular contact when viewed in cross section. The two inlets need not necessarily be orientated concentrically, however they are preferably so. Furthermore the orifices need not necessarily be circular, although they are preferably so. In this example embodiment, preferably the inner inlet is the first inlet (i.e. the inlet for the solution of substance in solvent). Such a co-axial arrangement may, for example, be formed by providing one syringe needle inside another.

Preferably the apparatus further comprises means for bulk mixing of the liquids delivered to the mixing chamber via the first and second inlets. The preferred means is a stirrer. Most preferably the mixing means should be non grinding e.g. a non-grinding magnetic stirrer or an overhead stirrer.

Desirably, stirring speed will be set at a level that gives efficient mixing in the mixing chamber, but without inducing vortex and particle shearing effects.

Vortex effects are undesirable since they have a tendency to disrupt the cavitation caused by the source of ultrasonic radiation. Furthermore they may cause particle size reduction through liquid micronisation-like processes.

Shearing effects are undesirable since they will vary from one agitator type to another and will tend to reduce the predictability of the particle size and shape.

Desirably the means for delivering the contents of the first and second reservoirs to the mixing chamber via the first and second inlet ports respectively at independent controlled flow rate comprises one or more pumps. Preferably a pump will be provided for each of the first and second reservoirs. A range of pumps are available and may be suitable for the apparatus according to the invention. The pump may, for example, be a peristaltic pump. Pumps which are essentially non-pulsing are preferred.

The contents of the first and second reservoirs may be delivered to the mixing chamber at a range of flow rates which will be selected and optimised according to the nature of the substance, the solvent, the anti-solvent and the power and frequency of the source of ultrasonic radiation. The solubility of the substance in the solvent relative to the anti-solvent is a particularly important variable. The lower this ratio is, the lower may be the flow rate of anti-solvent relative to the substance/solvent solution. Usually the flow rate of the anti-solvent will exceed that of the solvent solution, the excess typically being ≧2:1 e.g. up to 10:1. A ratio of 4:1 is, for example, particularly suitable for fluticasone propionate.

Typically flow rates of solvent solution will be in the range of 1-500 mil/min especially 100 to 400 ml/min. Typical flow rates of anti-solvent will be in the range of 1-2000 ml/min especially 300 to 1200 ml/min. Higher flow rates of anti-solvent have a tendency to result in crystalline particles of smaller mean size.

Preferably the outlet port of the apparatus is disposed above the inlet ports in the mixing chamber such that the liquid in the mixing chamber flows from a lower to a higher point in the chamber before exiting. This arrangement optimises mixing and allows ready balance of the rates of inflow and outflow.

Preferably the mixing chamber is substantially circular in X-section.

The position of the outlet port relative to the inlet ports is believed to have an influence on the size of the crystalline particles generated. Without being limited by theory, it is believed that the greater the distance between the inlet ports and outlet port, the greater the average residence time of the particles in the flow cell, the longer the crystalline particles have to mature. When particle maturation is permitted to take place in the vessel this may be advantageous if it reduces the likelihood of downstream blockages.

Preferably the outlet port is located approximately half way up the side of the mixing chamber.

In one particular embodiment of the invention, the apparatus according to the invention is provided with a number of optional outlet points at different heights relative to the inlet ports. Fractions of differing particles size may then be "tapped" from the different outlet ports.

The mixing chamber may be manufactured from a range of conventional materials however these will preferably be selected so as to be unreactive with the substance, the solvent or the anti-solvent. The mixing chamber may be of any suitable size, whether of a size suitable for bench-scale preparation, industrial pilot scale preparation or industrial manufacturing scale. Substance throughputs are a function of the substance, the concentration and the flow rates. However for the purposes of illustration exemplary throughputs of certain substances as tabulated below:

| Substance | Concentration g/ml | Flow rate ml/min | Output |
|---|---|---|---|
| Salmeterol xinafoate | 0.17 | 20 | 204 g/hr, 4.9 kg/24 h |
| Fluticasone propionate | 0.07 | 30 | 126 g/hr, 3.0 kg/24 h |
| Fluticasone propionate | 0.07 | 120 | 504 g/hr, 12.0 kg/24 h |
| Salmeterol xinafoate and fluticasone propionate in combination | 0.07 | 20 | 84 g/hr, 2.0 kg/24 h. |
| Naratriptan hydrochloride: | 0.025 | 30 | 45 g/hr, 1.1 kg/24 h |

Particles suspended in the liquid discharged from the mixing chamber at the outlet port may be collected by means of one of a number of conventional particle capturing techniques e.g. filtration, centrifugation, freeze drying or spray drying.

In respect of filtration means; a wide range of suitable filters are known to persons skilled in the art. Examples of filters include sinters (e.g. glass sinters), fibre filters (e.g. paper and nitrocellulose filters) and membrane filters. We have found that one advantageous filtration arrangement involves use of a glass fibre microfilter sandwiched between two Whatman paper filters (e.g. Whatman 54 filters). The particle size of the filter will be appropriate for the product collected. It is possible to modify the distribution of particles at the fine end by selecting a filter size which allows fines to pass through the filter.

In order to reduce the incidence of undesirable "bridging" between particles during harvesting we have found that it is preferable to flush out any residual solvent used for dissolution by thoroughly washing the filter cake with an anti-solvent for the substance. Preferably the anti-solvent will be the same anti-solvent that is used in the main process.

The filter may be provided with a drying facility such as by vacuum and/or heat. In order to facilitate drying especially when the anti-solvent is relatively non-volatile (such as is water) we find that it is advantageous to displace the anti-solvent With a more volatile anti-solvent. Displacement may be achieved by layering the second anti-solvent on top of the filter cake. For many substances, and particularly for salmeterol xinafoate and fluticasone propionate, when the first anti-solvent is water we have found that displacement of the water with diisopropylether (IPE) is particularly satisfactory since approximately 80% of the diisopropylether may be removed by vacuum and remaining 20% by heat at 40° C. Alternatively the particles of crystalline substance may be collected on a fluidised filter bed and drying achieved with a warm inert gas such as nitrogen gas. Alternatively in a system where the crystallisation of the substance out of solution is essentially complete, the outflow from the mixing chamber may be fed to a spray-drying facility such that the solvent/anti-solvent mixture is vaporised and the particles collected dry.

Alternatively the slurry of crystalline particles which outputs from the mixing chamber may first be concentrated by passage through a cross flow filtration apparatus and then isolated using spray drying or freeze drying technology.

Generally, before use it may be desirable to sieve the dried product gently through a coarse sieve to breakdown soft aggregates without effecting size reduction of the primary particles.

Ultrasound frequencies above around 20 kHz are generally suitable; frequencies in the range 20-25 kHz are particularly suitable, especially 22 kHz. Lower frequencies than these are generally to be avoided since they may fall within a range audible to the human ear. For a given geometry of mixing chamber, certain frequencies may be prone to cancellation. Generally this phenomenon may be avoided by modest tuning of the probe frequency. Ultrasound power in the range 5-5000W preferably 10-1000W e.g. 10-100 W with typical power/probe area ratios of 1-80 W/cm$^2$ may be suitable (although we are not aware of any theoretical upper limit); in general smaller particles are obtainable using higher power; Low power/probe area ratios are preferred e.g. in the range 1-8, especially 2-5 W/cm$^2$.

The source of ultrasonic radiation will be located sufficiently close to the inlet ports, particularly the first inlet port, such that it efficiently aids induction of precipitation of particles of substance by causing cavitation in the mixing liquids. As noted above, preferably the source is located in close proximity to the first inlet port such that the outflow from the first and second inlet port is directed towards it. The source preferably includes an ultrasound probe (or perhaps more than one probe). However wrap-around geometries may also be contemplated e.g. wherein ultrasound transducers transmit ultrasonic radiation through pipes. The source of ultrasonic radiation may be enclosed in a protective jacket (e.g. one made of glass) containing a sono-radiation transmission fluid (e.g. silicone or olive oil). Preferably the geometry of the ultrasound probe in the region towards which the outflow of the inlet and outlet ports is directed resembles a negative gain horn as shown in FIG. 3. FIG. 3 also shows an ordinary type ultrasound probe.

As a further aspect of the invention we provide a process for preparing crystalline particles of a substance using an apparatus according to the invention which comprises:

(i) delivering the contents of the first and second reservoirs to the mixing chamber via the first and second inlet ports respectively at independent controlled flow rate;

(ii) supplying ultrasonic radiation to the vicinity of the inlet ports (particularly the first inlet port); and (iii) collecting the crystalline particles suspended in the liquid discharged from the mixing chamber at the outlet port.

The process is particularly suitable for preparing particles of substances which are pharmaceutical or carrier substances suitable for inhalation therapy.

Examples of pharmaceutical substances suitable for inhalation therapy include analgesics, e.g., codeine, dihydromorphine, ergotamine, fentanyl or morphine; anginal preparations, e.g., diltiazem; antiallergics, e.g., cromoglycate (e.g. as the sodium salt), ketotifen or nedocromil (e.g. as the sodium salt); antiinfectives e.g., cephalosporins, penicillins, streptomycin, sulphonamides, tetracyclines and pentamidine; antihistamines, e.g., methapyrilene; anti-inflammatories, e.g., beclomethasone (e.g. as the dipropionate ester), fluticasone (e.g. as the propionate), flunisolide, budesonide, rofleponide, mometasone (e.g. as the furoate), ciclesonide or triamcinolone (e.g. as the acetonide); antitussives, e.g., noscapine; bronchodilators, e.g., albuterol (e.g. as the free base or sulphate), salmeterol (e.g. as the xinafoate), ephedrine, adrenaline, fenoterol (e.g. as the hydrobromide), formoterol (e.g. as the fumarate), isoprenaline, metaproterenol, phenylephrine, phenylpropanolamine, pirbuterol (e.g. as the acetate), reproterol (e.g. as the hydrochloride), rimiterol, terbutaline (e.g. as the sulphate), isoetharine, tulobuterol or (−)-4-amino-3,5-dichloroo-α-[[[6-[2-(2-pyridinyl)ethoxy]hexyl]methyl]benzenemethanol; PDE4 inhibitors e,g, cilomilast or roflumilast; leukotriene antagonists e.g. montelukast, pranlukast and zafirlukast; diuretics, e.g., amiloride; anticholinergics, e.g., ipratropium (e.g. as the bromide), tiotropium, atropine or oxitropium; hormones, e.g., cortisone, hydrocortisone or prednisolone; xanthines, e.g., aminophylline, choline theophyllinate, lysine theophyllinate or theophylline; therapeutic proteins and peptides, e.g., insulin or glucagon; and salts, esters and solvates of any of the above. Other examples include 4-hydroxy-7-[2-[[2-[[3-(2-phenylethoxy)propyl]sulfonyl]ethyl]amino]ethyl-2(3H)-benzothiazolone or butixicort and salts and solvates thereof.

Other examples of pharmaceutical substances suitable for inhalation therapy which are of particular interest are:

(2R,3R,4S,5R)-2-[6-Amino-2-(1S-hydroxymethyl-2-phenyl-ethylamino)-purin-9-yl]-5-(2-ethyl-2H-tetrazol-5-yl)-tetrahydro-furan-3,4-diol or a salt thereof (eg. the maleate salt);

(2S)-3-[4-({[4-(Aminocarbonyl)-1-piperidinyl]carbonyl}oxy)phenyl]-2-[((2S)-4-methyl-2-{[2-(2-methylphenoxy)acetyl]amino}pentanoyl)amino]propanoic acid or a salt thereof (e.g. as free acid or potassium salt); and 6α,9α-Difluoro-17α-[(2-furanylcarbonyl)oxy]-11β-hydroxy-16α-methyl-3-oxo-androsta-1,4-diene-17β-carbothioic acid S-fluoromethyl ester.

Examples of other pharmaceutical substances for which the process according to the invention is useful include compounds to be administered orally such as naratriptan (e.g. as hydrochloride).

Pharmaceutical substances as described above include asymmetric molecules which may exist as mixtures of optical isomers (e.g. as racemates) or as purified single enantiomers.

Pharmaceutical substances of particular interest include fluticasone, beclomethasone, salmeterol, salbutamol or an ester, salt or solvate thereof. The substance of most interest is salmeterol xinafoate (including the racemate or the purified r- or s-enantiomers). Fluticasone propionate is also of particular interest.

Examples of carrier substances include lactose. Another example is mannitol.

The solvent and anti-solvent liquids will be selected so as to be appropriate for the substance. Preferably, they are readily miscible in the proportions employed. Suitable combinations of solvent/anti-solvent include acetone/water, ethanol/IPA, methanol/IPA, methanol/water, DMF/water, DMAc/water, DMSO/water-and reciprocal pairs. Methanol/IPE is also a suitable pairing.

1,1,1,2-tetrafluoroethane (HFA134a) and 1,1,1,2,3,3,3-heptafluoro-n-propane (HFA227) are also potential solvents or anti-solvents which may be paired e.g. with ethanol. However the use of these gases in liquefied form would require the use of cold or pressurised equipment.

For generation of small particles by the process according to the invention, it is preferred that the difference between the dissolution properties of the solvent and anti-solvent be as great as possible. For reasons of industrial efficiency (particularly in order to reduce the throughput volumes of liquid) it is preferred to use concentrations of substance in solvent which are as high as possible. Nevertheless the solutions must be stable and not prone to crystallisation before discharge into the continuous flow cell. With this end in mind, it may be preferred to use the solution of the substance in the solvent at elevated temperature. It may also be preferable to cool the anti-solvent.

In order to prevent premature precipitation of the dissolved substance in the lines it Will generally be desired to prime the apparatus by first pumping it with solvent. It may be preferred to prime the apparatus by pumping it with heated solvent, particularly when the dissolved substance is close to its solubility limit.

When the substance is fluticasone propionate we prefer the solvent to be acetone and the anti-solvent to be water.

When the substance is salmeterol xinafoate we prefer the solvent to be methanol or acetone (more preferably methanol) and the anti-solvent to be water or IMS (more preferably water).

When the substance is salbutamol sulphate, we prefer the solvent to be water and the anti-solvent to be IMS.

When the substance is beclomethasone dipropionate we prefer the solvent to be IMS and the anti-solvent to be water.

When the substance is lactose we prefer the solvent to be water and the anti-solvent to be ethanol.

When the substance is budesonide, we prefer the solvent to be IMS and the anti-solvent to be water.

When the substance is formoterol fumarate or terbutaline sulphate we prefer the solvent to be methanol or acetone and the anti-solvent to be water or IMS.

When the substance is 2,6-diamino-3-(2,3,5-trichlorophenyl)pyrazine we prefer the solvent to be methanol and the anti-solvent to be water.

When the substance is 2(S)-(2-benzoyl-phenylamino)3-{4-[2-(5-methyl-2-phenyl-oxazol-4-yl)ethoxy]-phenyl}-propionic acid we prefer the solvent to be acetone and the anti-solvent to be water.

When the substance is naratriptan hydrochloride we prefer the solvent to be methanol and the anti-solvent to be IPE.

We have found that the method according to the invention is suitable for producing populations of mixtures when the substance is a mixture of substances. When the substance is a mixture the method has particular advantages since it is capable of producing mixtures of crystalline particles of very high homogeneity without the need for any blending step. When the substance is a mixture the solvent and anti-solvent will have to be appropriate for all components of the mixture. Differential solubilities in the recrystallisation mixture tend to result in the output proportions of the mixture differing from the initial proportions in solution in the solvent and so appropriate adjustment of the input proportions to achieve the desired output proportions may be necessary.

The method according to the invention is particularly suitable for producing mixtures of crystalline particles of salmeterol and fluticasone or salts and esters thereof e.g. salmeterol xinafoate and fluticasone propionate. The preferred solvent is acetone. The preferred anti-solvent is water. Recrystallisation from acetone using water as anti-solvent tends to cause an increase in the ratio of salmeterol xinafoate to fluticasone propionate relative to their proportion in solution in acetone. The method is also expected to be suitable for producing mixtures of crystalline particles of formoterol and budesonide or salts and esters thereof e.g. formoterol fumarate and budesonide.

As a yet further aspect of the invention we provide a population of particles obtainable by a process according to the invention.

Particles of pharmaceutical or carrier substances may be obtained which are suitable for use in a pharmaceutical composition for inhalation therapy, such as dry powder composition (whether containing pure drug, or drug mixed with a carrier such as lactose) or a pressurised liquid formulation (e.g. a formulation comprising a hydrofluoroalkane propellant such as HFA134a or HFA227).

Pressurised liquid formulations suitable for metered-dose inhalers will be retained in canisters, typically aluminium canisters (which may be plastics lined) which are provided with a metering valve of appropriate metering volume.

We also provide a pharmaceutical composition comprising a population of particles prepared according to the invention.

The advantages that the invention may possess include the fact that the process may be performed in a continuous manner without requirements for batch processing, that process may be scaled up with relative ease and that the apparatus and process are capable of producing particle size distributions of very high uniformity index (defined as D10/D90×100) and particles of size in the low micron range.

The invention will be illustrated by reference to FIGS. 1a and 2a in which mixing chamber 5 is provided with an inlet having a first inlet port connected to first reservoir 3 containing substance dissolved in solvent and second inlet port connected to second reservoir 4 containing anti-solvent. First and second inlet ports may have parallel geometry as shown in FIG. 1b or co-axial geometry as shown in FIG. 2b. Pumps 1 and 2 deliver liquid from reservoirs 3 and 4 to mixing chamber 5 at a controlled rate. An ultrasound probe 6 is located in the vicinity of, and just above, the inlet ports. When pumps 1 and 2 are in operation, liquids from reservoirs 3 and 4 are delivered to mixing chamber 5 and may optionally be stirred, for example, with the aid of magnetic stirrer. Liquid containing the particles of substance thus generated flows out of the mixing chamber via an exit port where they are collected e.g. by means of a filter.

Typical dimensions for a one litre mixing vessel are as follows:

Width: 15 cm

Total height: ca.38 cm

One outlet at 1 litre volume mark, which is ca. 12 cm up the vessel from the bottom outlet.

DETAILED DESCRIPTION

Abbreviatons

IPA isopropylalcohol
DMAc dimethylacetamide
IMS industrial methylated spirits
DMF dimethylformamide
IPE isopropylether
DMSO dimethylsulphoxide
   HFA134a 1,1,1,2-tetrafluoroethane
   HFA227 1,1,1,2,3,3,3-heptafluoro-n-propane All publications, including but not limited to patents and patent applications, cited in this specification are herein incorporated by reference as if each individual publication were specifically and individually indicated to be incorporated by reference herein as though fully set forth.

Throughout the specification and the claims which follow, unless the context requires otherwise, the word 'comprise', and variations such as 'comprises' and 'comprising', will be understood to imply the inclusion of a stated integer or step or group of integers but not to the exclusion of any other integer or step or group of integers or steps.

The following examples serve to illustrate the invention.

EXAMPLES

Figure 2A:
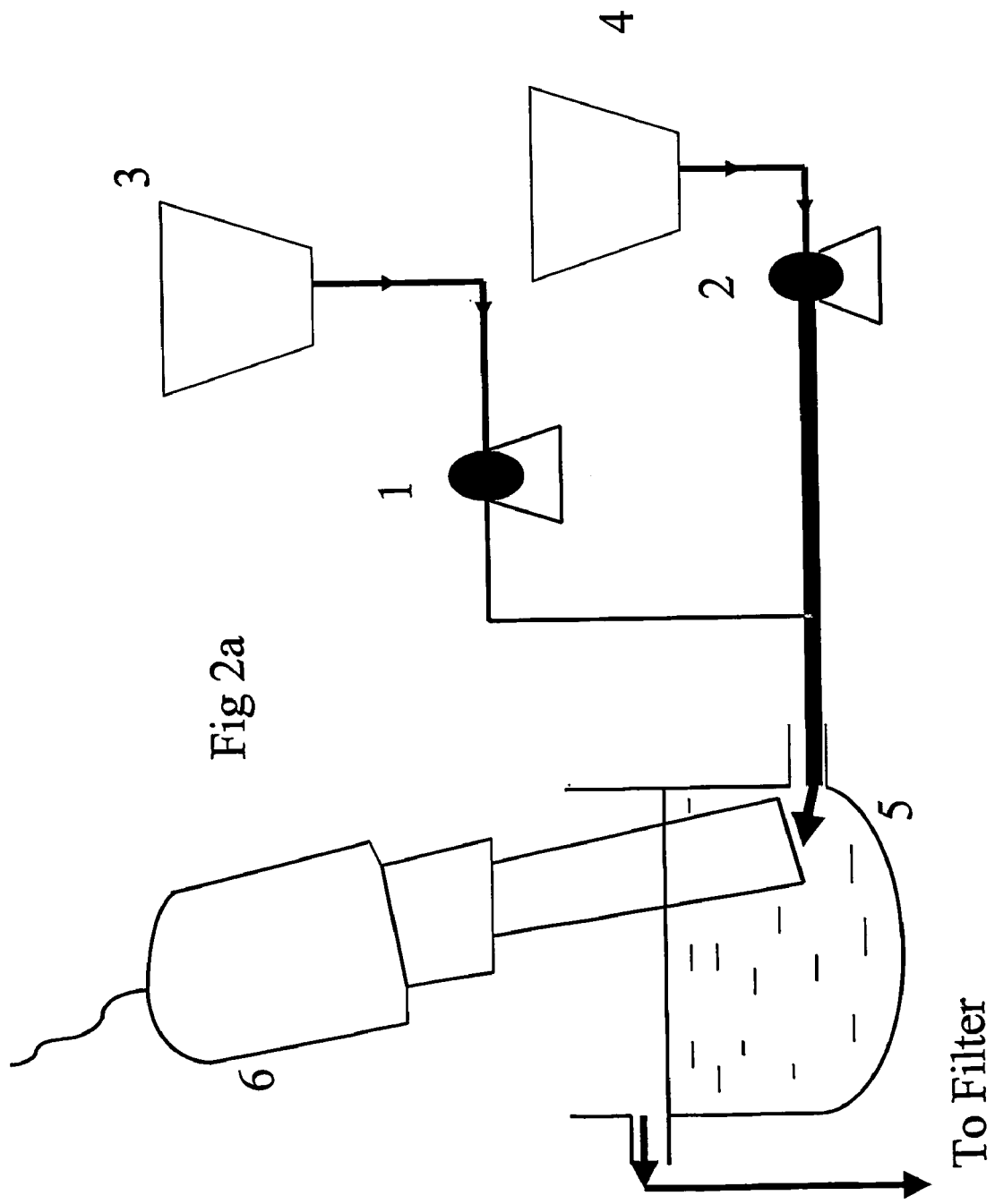
Figure 2B:
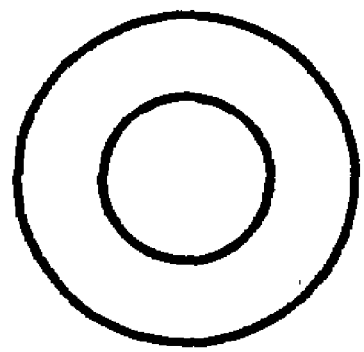
Figure 3:
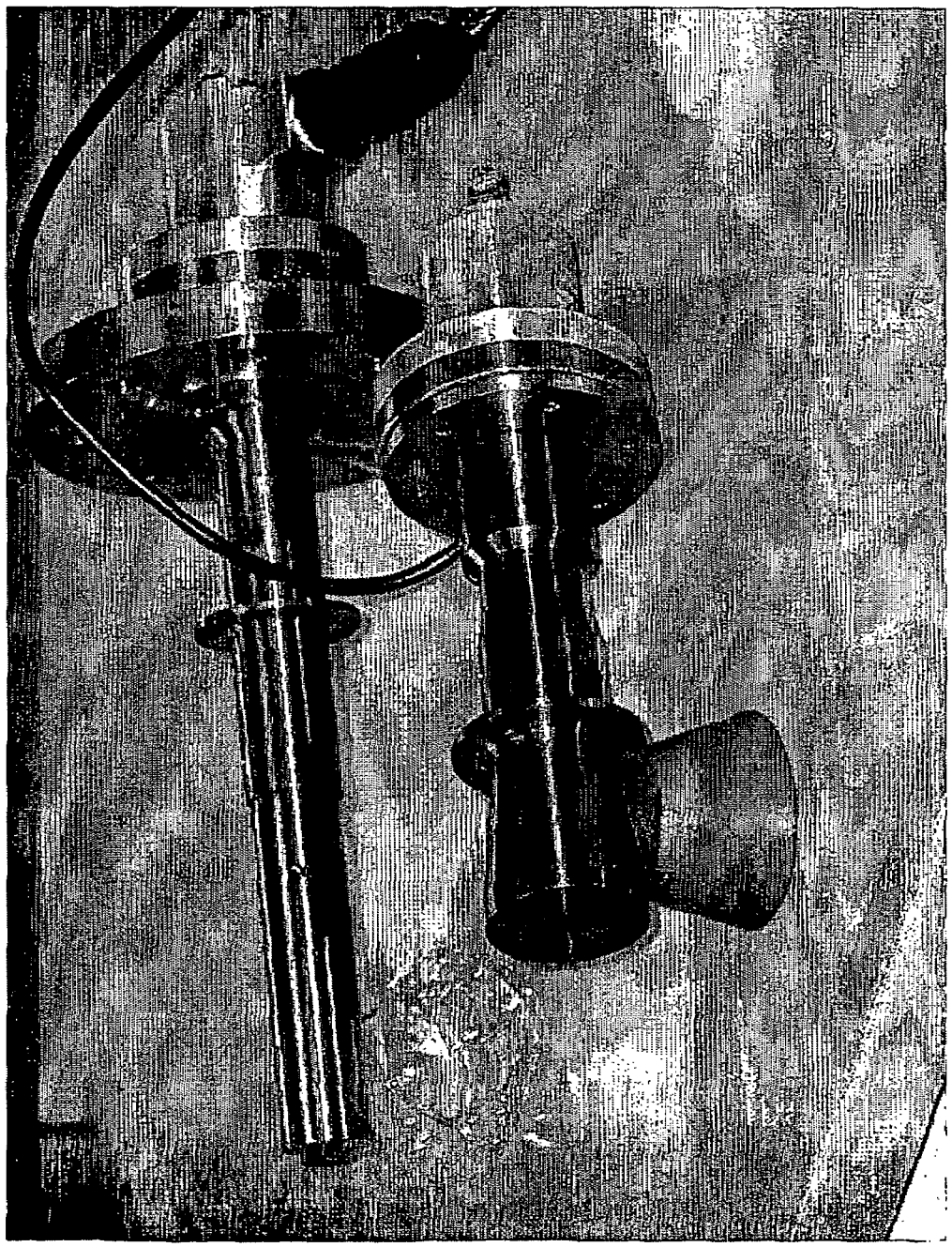
FIG. 3: Showing a photograph of two types of ultrasound probe (negative gain horn type. shown in foreground and ordinary type shown in background) (N.B. the support for the active end of each shown in the figure can be disregarded).

A continuous flow reaction cell with coaxial inlets at the bottom and a run-out ca. half way up the side of the vessel essentially as shown in FIG. 2a and 2b was used for all experiments. The ultrasound probe used with negative gain horn was as shown in detail in FIG. 3, with a diameter at the extremity of the probe of 5 cm. Co-axial feed of input liquids was achieved using a syringe of internal diameter 2 mm approximately having within it a syringe of internal diameter 1 mm approximately.

Ultrasound was supplied at a frequency of 20 kHz, ultrasound probe maximum power was 500 W.

Example 1

Distributions of Particles of Crystalline Fluticasone Propionate

Experimental Procedure

The drug substance (fluticasone propionate, FP) (1 wt) was dissolved in acetone (15-20 vols, according to experiment) by heating to 56° C. and then allowed to cool to between 25 and 35° C. A first peristaltic pump was connected to the said FP/acetone solution and a second peristaltic pump was connected to a water reservoir wherein the water was in the temperature range of about 3-30° C. Prior to starting the pumps the mixing chamber was filled with a solution of acetone and water (the ratio of each being the same as the relative pumping rates from the two reservoirs). By doing this, the relative concentrations of the water to acetone remained constant throughout the crystallisation. The temperature of the mixing chamber was maintained in the range about −10 to +30° C. by passing tempered heat transfer fluid through the vessel jacket. The FP/acetone solution inlet and water inlet were arranged coaxially or in parallel (as shown in FIGS. 1*a*/1*b*/2*a*/2*b*) and the tip of the ultrasound probe was positioned so that it is just above the inlets. Stirring with the aid of a non-grinding magnetic stirrer bar or overhead stirrer was initiated as is the ultrasound at intensity 2-4 W/cm$^2$ (with respect to the tip face area of the probe). A comparison experiment with the ultrasound probe in place but zero power was performed. Re-crystallisations were carried out from various mixtures of acetone and water (by altering the flow rates of each) as dictated by the parameters set out in the experimental design. Finally the pumps were started simultaneously. A suspension of the crystals in the re-crystallisation mixture was allowed to exit via the overflow directly on to a filter bed. The slurry is isolated and washed with water and dried in vacuo between about 20 to 50° C.

Comparison experiments were performed using the apparatus with diametrically opposite input feeds described in WO 00/38811 in which save for the input feed geometry and the specific parameters given in the table below, and the vessel dimensions given below, other parameters Were similar to those used for the experiments using the present invention.

In the mixing chamber use d in this comparison experiment, the diameter was 5 cm the height was 12.5 cm, the height of the outlet above the base was 7 cm and the height of the inlets above the base was 1.5 cm.

Samples were sized using the Malvern laser diffraction particle sizer and the results analysed using multi-dimensional model fitting software (such as Design Expert 5).

Results were obtained as follows:

| Config- | Flow rate ml/min | | Conc. | U/sound/ | Malvern size data/micron | | | Run |
|---|---|---|---|---|---|---|---|---|
| uration | Water | FP/Acetone | of FP* | W/cm$^2$ | D10 | D50 | D90 | No. |
| A | 480 | 120 | 1 g/18 ml | Nil | 0.60 | 2.25 | 6.29 | 1 |
| A | 480 | 120 | 1 g/18 ml | 2 | 0.52 | 2.08 | 5.10 | 2 |
| A | 600 | 120 | 1 g/18 ml | 2 | 0.47 | 1.78 | 4.39 | 3 |
| A | 600 | 120 | 1 g/30 ml | 4 | 0.43** | 1.51** | 3.75** | 4 |
| A | 360 | 120 | 1 g/15 ml | 2 | 0.86 | 2.98 | 6.92 | 5 |
| B | 600 | 200 | 1 g/18 ml | 2 | 0.53 | 2.06 | 4.93 | 6 |

-continued

| Config- | Flow rate ml/min | | Conc. | U/sound/ | Malvern size data/micron | | | Run |
|---|---|---|---|---|---|---|---|---|
| uration | Water | FP/Acetone | of FP* | W/cm$^2$ | D10 | D50 | D90 | No. |
| C | 480 | 120 | 1 g/15 ml | 2 | 1.15 | 4.19 | 10.00 | 7 |
| D | 400 | 200 | 1 g/18 ml | 2 | 1.88 | 5.13 | 11.86 | 8 |
| | Comparator: standard micronised FP | | | | 0.60 | 1.62 | 3.20 | |

Figure 1A:
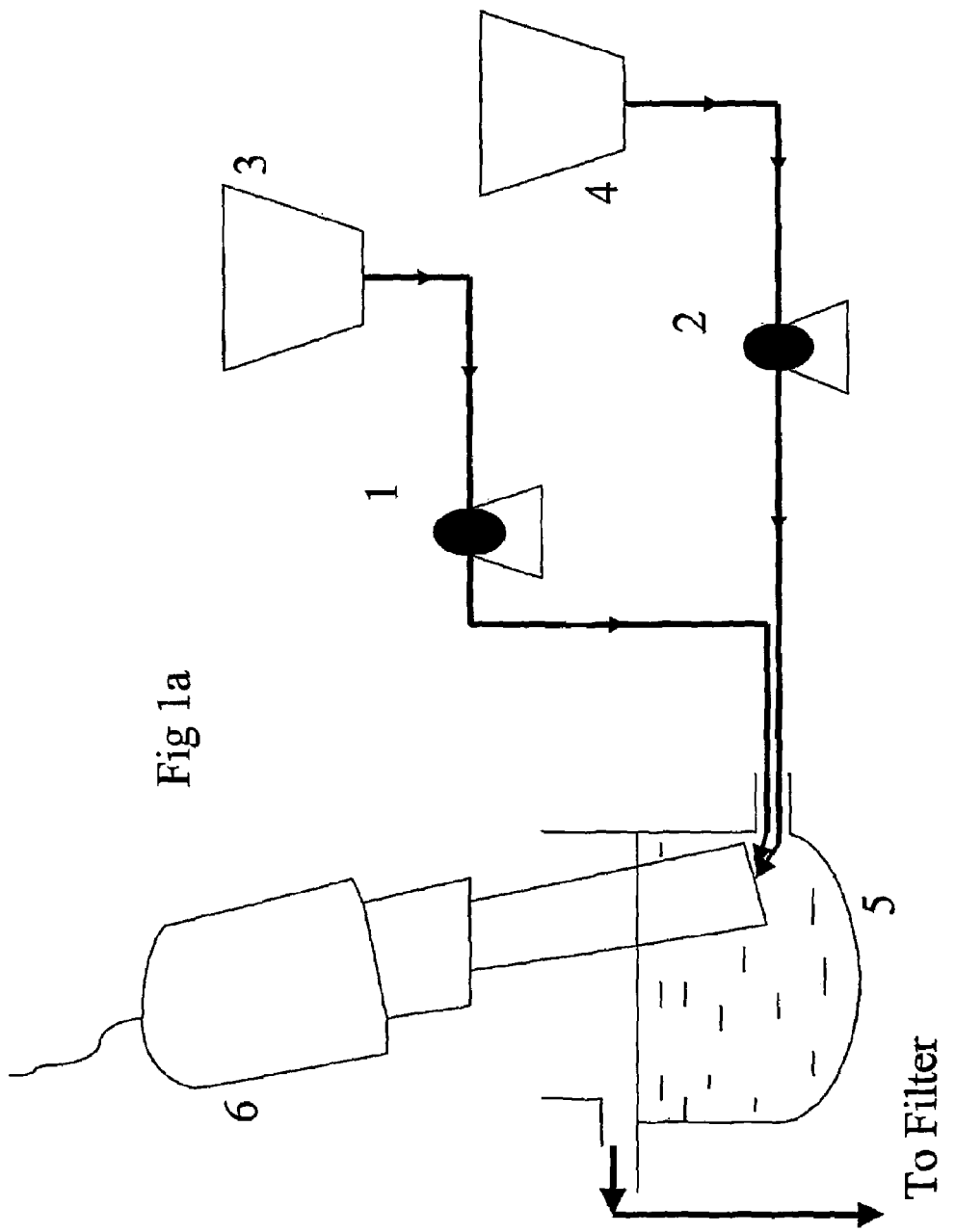
FIGS. 1a, 2a: Showing an example apparatus according to the invention.
Figure 1B:
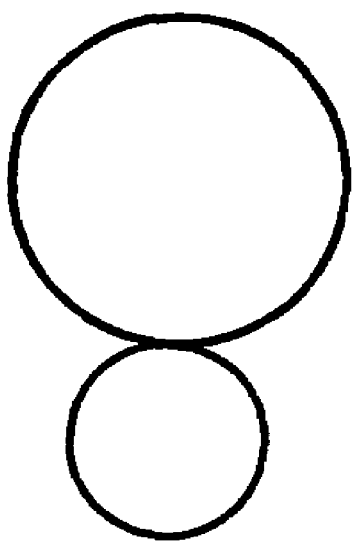
FIGS. 1b, 2b: Showing detail of the inlet port geometries (in cross section).

Key
*concentration of FP expressed as grammes of FP in ml of solvent (acetone)
Configuration "A": co-axial input feeds as shown in FIGS. 1b and 2b.
Configuration "B": parallel input feeds as shown in FIGS. 1a and 2a.
Configuration "C": diametrically opposite input feeds as described in WO00/38811 with ultrasound probe just above FP/acetone feed.
Configuration "D": diametrically opposite input feeds as described in WO00/38811 with ultrasound probe just above water feed.
All size figures are based on average of 2 results except that marked **.
**In the repeat experiment, D10, D50 and D90 values of 0.46, 1.63 and 492.49 micron were obtained. Whilst these D10 and D50 values are consistent with those of the first experiment, the figure of 492.49 micron for D90 was disregarded since this was believed to be erroneous and probably caused by the presence of a large granule in the sample.

From these results, Run 4 material appear to be a very good match in terms of particles distribution for micronised material. Experiments using configuration A or B according to the invention resulted in a finer particle size distributions (smaller D10, D50 and D90) than experiments using the prior art configurations C and D.

Example 2

An aluminium canister may be charged with particles of fluticasone propionate prepared according to the invention (e.g. as described in Example 1, run 4). A metering valve (Valois) may be crimped on and liquefied HFA134a added through the valve.

Example 3

A dry powder composition for inhalation may be prepared by mixing particles of fluticasone propionate prepared according to the invention (e.g. as described in Example 1, run-4) with milled lactose.

The invention claimed is:

1. A process for preparing crystalline particles of substance which comprises mixing in a continuous flow cell in the presence of ultrasonic radiation a flowing solution of the substance in a liquid solvent with a flowing liquid anti-solvent for said substance, and collecting the resultant crystalline particles generated, characterised in that the solution and anti-solvent are delivered into the continuous flow cell in parallel contacting streams.

2. A process according to claim 1 wherein the liquid anti-solvent is miscible with the liquid solvent.

3. A process according to claim 1 wherein the substance is a mixture.

4. A process according to claim 3 wherein the substance is a mixture of fluticasone propionate and salmeterol xinafoate.

5. A process for preparing crystalline particles of substance which comprises mixing in a continuous flow cell in the presence of ultrasonic radiation a flowing solution of the substance in a liquid solvent with a flowing liquid anti-solvent for said substance, and collecting the resultant crystalline particles generated, characterised in that the solution and anti-solvent are delivered into the continuous flow cell in parallel contacting streams using an apparatus for preparing crystalline particles of a substance which comprises:

(i) a first reservoir of said substance dissolved in a liquid solvent;

(ii) a second reservoir of liquid anti-solvent for said substance;

(iii) a mixing chamber having first and second inlet ports and an outlet port;

(iv) means for delivering the contents of the first and second reservoirs to the mixing chamber via the first and second inlet ports respectively at independent controlled flow rate, which first and second inlet ports respectively at independent controlled flow rate, which first and second inlet ports are orientated such that the contents of the first and second reservoirs are delivered into the mixing chamber in parallel contacting streams;

(v) a source of ultrasonic radiation located in the vicinity of the first inlet; and (vi) means for collecting particles suspended in the liquid discharged from the mixing chamber at the outlet port, which comprises:

(i) delivering the contents of the first and second reservoirs to the mixing chamber via the first and second inlet ports respectively at independent controlled flow rate;

(ii) supplying ultrasonic radiation to the vicinity of the inlet ports; and (iii) collecting the crystalline particles suspended in the liquid discharged from the mixing chamber at the outlet port.

6. A process according to claim 5 wherein the substance is a pharmaceutical or carrier substance suitable for inhalation therapy.

7. A process according to claim 6 wherein the substance is fluticasone, beclomethasone, salmeterol, salbutamol or an ester, salt or solvate thereof.

8. A process according to claim 6 wherein the substance is lactose.

9. A process according to claim 7 wherein the substance is fluticasone propionate.

10. A process according to claim 7 wherein the substance is salmeterol xinafoate.

11. A process according to claim 9 wherein the solvent is acetone and the anti-solvent is water.

12. A process according to claim 10 wherein the solvent is methanol and the anti-solvent is water.

13. A process according to claim 5 wherein the substance is naratriptan hydrochloride.

* * * * *